United States Patent [19]
Kanegae

[11] Patent Number: 6,124,998
[45] Date of Patent: Sep. 26, 2000

[54] INFORMATION STORAGE DEVICE

[75] Inventor: Masahide Kanegae, Kawasaki, Japan

[73] Assignee: Fujitsu Limited, Kawasaki, Japan

[21] Appl. No.: 09/001,885

[22] Filed: Dec. 31, 1997

[30] Foreign Application Priority Data

Jun. 6, 1997 [JP] Japan .................................. 9-149447

[51] Int. Cl.⁷ .................................................. G11B 5/02
[52] U.S. Cl. ................................ 360/68; 360/25; 360/55; 360/31
[58] Field of Search ................................ 360/25, 55, 31, 360/97.02, 68, 63, 128, 108, 46, 67, 281; 369/19, 53, 58; 702/136; 324/212, 226

[56] References Cited

U.S. PATENT DOCUMENTS

| 5,455,717 | 10/1995 | Van Doorn et al. ................... 360/25 X |
| 5,566,077 | 10/1996 | Kulakowski et al. ................ 369/19 X |
| 5,732,055 | 3/1998 | Masaki et al. ............................ 369/54 |
| 5,859,746 | 1/1999 | Ishida et al. ......................... 360/97.01 |
| 5,923,485 | 7/1999 | Ito ............................................. 360/31 |
| 5,926,777 | 7/1999 | Vink ..................................... 360/31 X |
| 5,978,163 | 11/1999 | Cunningham ............................. 360/68 |

FOREIGN PATENT DOCUMENTS

| 60-143404 | 7/1985 | Japan . |
| 1317208 | 12/1989 | Japan . |
| 5258215 | 10/1993 | Japan . |
| 6111457 | 4/1994 | Japan . |
| 6162412 | 6/1994 | Japan . |
| 6231405 | 8/1994 | Japan . |

*Primary Examiner*—Alan T Faber
*Attorney, Agent, or Firm*—Greer, Burns & Crain, Ltd.

[57] ABSTRACT

A recording unit is provided, to which a write current is supplied in accordance with information to be stored. The recording unit records the information in a recording medium in accordance with the write current. A temperature detecting unit detects an ambient temperature of the recording medium. A timer monitors time for the temperature detecting unit to detect the ambient temperature of the recording medium at predetermined times. A write-current setting unit sets the write current for the ambient temperature of the recording medium detected by the temperature detecting unit, each time when the temperature detecting unit detects the ambient temperature of the recording medium, the time being obtained from the timer.

19 Claims, 8 Drawing Sheets

FIG. 4

| ADDRESS | DATA |
|---|---|
| ***1 | REFERENCE CURRENT VALUE ISW1 FOR HEAD 1 |
| ***2 | REFERENCE CURRENT VALUE ISW2 FOR HEAD 2 |
| ***n | REFERENCE CURRENT VALUE ISWn FOR HEAD n |
| ***2m | REFERENCE CURRENT VALUE ISW2m FOR HEAD 2m |

FIG. 5

| ADDRESS | DATA |
|---|---|
| 1 * * 1 | TEMPERATURE THRESHOLD VALUE $\tau 1$ |
| 1 * * 2 | CURRENT INDICATION VALUE $S1$ |
| 1 * * 3 | TEMPERATURE THRESHOLD VALUE $\tau 2$ |
| 1 * * 4 | CURRENT INDICATION VALUE $S2$ |
| ~ | ~ |
| 1 * * (2k-1) | TEMPERATURE THRESHOLD VALUE $\tau k$ |
| 1 * * (2k) | CURRENT INDICATION VALUE $Sk$ |

FIG. 6

| ADDRESS | DATA |
|---|---|
| 2 * * 1 | CURRENT VALUE IW1 FOR HEAD 1 |
| 2 * * 2 | CURRENT VALUE IW2 FOR HEAD 2 |
| 2 * * n | CURRENT VALUE IWn FOR HEAD n |
| 2 * * 2m | CURRENT VALUE IW2m FOR HEAD 2m |

INFORMATION STORAGE DEVICE

BACKGROUND OF THE INVENTION

1. Field of the Invention

The present invention relates to an information storage device, and, in particular, to an information storage device in which the write current, which is used for writing data in a recording medium, changes in accordance with the temperature.

Recently, there has been progress in high-density recording and high-speed recording/reproducing in an information storage device such as a hard-disk drive. With the progress in high-density recording and high-speed recording/reproducing in an information storage device, it is requested to obtain an optimum write current, which is used for writing data in a recording medium. In a hard disk, magnetization characteristics change in accordance with a change in the temperature. For example, when the temperature rises, the coercive force Hc decreases, and thereby, it is possible to adequately magnetize the disk with a small write current. When the temperature falls, the coercive force Hc increases, and thereby, a large write current is needed to adequately magnetize the disk.

In a case where the coercive force Hc decreases, a recording medium is magnetized with a small write current. Therefore, when a large write current is supplied, surrounding portions are also magnetized to some degree. In a case where the coercive force Hc increases, a large write current is needed to magnetize a recording medium. Therefore, when a small write current is supplied, sufficient magnetization cannot be performed, and thus, information cannot be adequately recorded.

It is assumed that the optimum current is set for obtaining the highest recording density in a high temperature condition. In this case, in a low temperature condition, the set write current is not sufficient, and thereby, adequate information recording cannot be performed. It is assumed that the optimum write current is set for obtaining the highest recording density in a low temperature condition. In this case, in a high temperature condition, the set write current is so large that the write current influences surrounding recorded information. As a result, adequate information reading cannot be performed.

Accordingly, it is necessary to set the optimum write current in accordance with the temperature.

2. Description of the Related Art

FIG. 1 shows a block diagram of an example of a magnetic-disk device (hard-disk drive) in the related art.

The magnetic-disk device 10 is connected to a personal computer 30. Programs to be processed by the personal computer, processed data and so forth are magnetically recorded in magnetic disks 12 through magnetic heads 11. (Although, in the figure, only one magnetic disk 12 and one magnetic head 11 are indicated, actually, a plurality of magnetic disks 12 are stacked and two magnetic heads 11 are provided for each magnetic disk 12.) Such information magnetically recorded in the magnetic disks 12 is read and reproduced. The magnetic disks are fixed to a shaft of a spindle motor 13, and are rotated in the A direction by the spindle motor 13. Each of the magnetic heads 11 faces a respective one of the top surfaces and the bottom surfaces of the magnetic disks 12. Each magnetic head 11 magnetically affects a respective one of the top surface and the bottom surface of the magnetic disk 12 so as to record information in the magnetic disk 13. (The magnetic head 11 facing the bottom surface of the magnetic disk 12 is not shown in the figure.) Each magnetic head 11 also reads information recorded in the magnetic disk 12.

The magnetic heads 11 are supported by arms 14, respectively, and perform recording of information to and reproducing of information from the magnetic disks 12 in a condition where each magnetic head 11 slightly floats from the respective one of the top and bottom surfaces of the magnetic disks 12.

The ends of arms 14, opposite to the ends on which the magnetic heads 11 are fixed, form a part of a voice coil motor 15. By the voice coil motor 15, the arms 14 are rotated in radial directions (the arrow B directions) of the magnetic disks 12 about a rotation shaft 16. Thus, the arms 14 move the magnetic heads 11 in the radial directions on the magnetic disks 12. The magnetic heads 11 are connected with a head IC 18 via connection lines 17.

The head IC 18 amplifies recording signals to be supplied to the magnetic heads 11, and amplifies reproduced signals reproduced through the magnetic heads 11. The head IC 18 is connected with a read/write circuit 19. The read/write circuit 19 encodes data supplied by an MPU (Micro Processing Unit) 20 into recording signals, and decodes read signals read through the magnetic heads 11 into data which can be processed by the MPU 20.

The MPU 20 is connected with the read/write circuit 19, a DSP (Digital Signal Processor) 21 and a HDC (Hard disk Drive Controller) 22. The MPU 20 processes information to be recorded in the magnetic disks 12 and information reproduced from the magnetic disks 12. Further, the MPU 20 controls the rotation of the magnetic disks 12 and positioning of the magnetic heads 11 in accordance with information read from the magnetic disks 12.

The DSP 21 generates digital data for controlling the rotation of the spindle motor 13 in accordance with digital data which is supplied by the MPU 20 and determines the rotational speed of the magnetic disks 12. Further, the DSP 21 generates digital data for controlling the rotation angle of the voice coil motor 15 in accordance with digital data which is supplied by the MPU 20 and determines the positions of the magnetic heads 11.

The digital data for controlling the rotation of the spindle motor 13 and the digital data for controlling the rotation angle of the voice coil motor 15, generated by the DSP 21, is supplied to a DAC (Digital-to-Analog Converter) 23. The DAC 23 converts the digital data for controlling the rotation of the spindle motor 13 and the digital data for controlling the rotation angle of the voice coil motor 15, supplied by the DSP 21, into an analog signal.

The digital data for controlling the rotation of the spindle motor 13 supplied by the DSP 21 to the DAC 23 is converted into analog data by the DAC 23, as mentioned above, and then, this analog signal is supplied to a spindle-motor driving circuit 24. The spindle-motor driving circuit 24 generates a driving signal, for driving the spindle motor 13, in accordance with the analog signal supplied by the DAC 23, and supplies the driving signal to the spindle motor 13. The spindle motor 13 is driven and thus is rotated by the driving signal supplied from the spindle-motor driving circuit 24, and rotates the magnetic disks 12 in the arrow A direction at a fixed rotational speed.

The digital data for controlling the rotation angle of the voice coil motor 15 supplied by the DSP 21 to the DAC 23 is converted into analog data by the DAC 23, as mentioned above, and then, this analog signal is supplied to a voice-coil-motor driving circuit 25. The voice-coil-motor driving circuit 25 generates a driving signal, for driving the voice coil motor 15, in accordance with the analog signal supplied by the DAC 23, and supplies the driving signal to the voice coil motor 13. The driving signal supplied from the voice-coil-motor driving circuit 25 causes the voice coil motor 15 to control the rotation angle of the arms 14 in the arrow B directions and thus position the magnetic heads 11.

The HDC 22 is provided between the MPU 20 and a connector 26 which is used for external connection. The HDC 22 controls data transmission/reception between the magnetic-disk device 10 and external equipment connected to the connector 26. The connector 26 is connected with external equipment such as a personal computer 30 or the like. Via the connector 26, data and various control signals are input and output.

The magnetization characteristics of the magnetic disks 12 change due to a change of temperature. For example, when the temperature rises, the coercive force Hc decreases, and thereby, it is possible to adequately magnetize the magnetic disk with a small write current. When the temperature falls, the coercive force Hc increases, and thereby, a large write current is needed to adequately magnetize the magnetic disk.

In a case where the coercive force Hc decreases, a recording medium is magnetized with a small write current. Therefore, when a large write current is supplied, surrounding portions are also magnetized to some degree. In a case where the coercive force Hc increases, a large write current is needed to magnetize a recording medium. Therefore, when a small write current is supplied, sufficient magnetization cannot be performed, and thus, information cannot be adequately recorded.

According to a first scenario, is assumed that an optimum current is set for obtaining highest recording density in a high temperature condition. In this case, in a low temperature condition, the set write current is not sufficient, and thereby, adequate information recording cannot be performed. According to a second scenario, is assumed that the optimum write current is set for obtaining highest recording density in a low temperature condition. In this case, in a high temperature condition, the set write current is so large that the write current influences to surrounding recorded information. As a result, adequate information reading cannot be performed.

The above-described problems are pronounced in a hard-disk device, where a recording density is more than 5,000 TPI (Tracks Per Inch).

Accordingly, in the magnetic-disk device (hard-disk drive) 10 shown in FIG. 1, it has been difficult to increase the recording density.

In order to achieve a higher recording density and a larger recording capacity, for example, as disclosed in Japanese Laid-Open Patent Application Nos.60-143404, 1-317208, 5-258215, a method of changing the optimum write current in accordance with the temperature is disclosed.

However, in the recording devices disclosed in Japanese Laid-Open Patent Application Nos.60-143404, 1-317208, 5-258215, the ambient temperature of a magnetic head is detected and, when the ambient temperature of the magnetic head changes, the write current is set. Accordingly, the write current setting operation is performed so frequently that an ordinary information writing operation may not be performed adequately.

SUMMARY OF THE INVENTION

The present invention has been devised in consideration of the above-mentioned problem. An object of the present invention is to provide an information storage device in which, with minimum necessary setting operations, information can be recorded in a recording medium with the optimum write current even when the temperature changes.

An information storage device, according to the present invention comprises:

recording means, to which a write current is supplied in accordance with information to be stored, the recording unit recording the information in a recording medium in accordance with the write current;

temperature detecting means for detecting an ambient temperature of the recording medium;

a timer for monitoring time for the temperature detecting means to detect the ambient temperature of the recording medium at predetermined times; and a write-current setting means for setting the write current for the ambient temperature of the recording medium detected by the temperature detecting means, each time when the temperature detecting means detects the ambient temperature of the recording medium, the each time being obtained from the timer.

Thereby, it is possible to set the write current for writing information on the recording medium in accordance with the ambient temperature of the recording medium. As a result, it is possible to perform information writing at the optimum condition. Further, it is possible to set the write current at predetermined times. As a result, unnecessary setting of the write current is prevented.

Time intervals between the times at which the temperature measuring means detects the ambient temperature of the recording medium may be such that, during a period from the time of starting a power supply to the time at which a temperature of the recording medium has reached a steady-state temperature, the interval increases in sequence, and after the time at which the temperature of the recording medium has reached the steady-state temperature, the interval is fixed.

Thereby, even during the period from the time of starting of the power supply to the time at which the temperature of the recording medium has reached the steady-state temperature, the write current is set in accordance with the temperature of the recording medium. As a result, it is possible to perform information writing using the optimum write current. Further, after a predetermined time has elapsed from the time of starting the power supply, the ambient temperature of the recording medium is detected and the write current is set at regular intervals. As a result, unnecessary write current settings are prevented, and it is possible to perform information writing using the optimum write current for the temperature of the recording medium.

The write current setting means may comprise:

reference-write-current storing means for storing a previously set reference write current for each recording means;

correction-amount storing means for storing correction amounts for respective temperatures detected by the temperature detecting means; and write-current controlling means which reads from the reference-write-current storing means the reference write current of the recording means for which the write current is to be set, reads from the correction-amount storing means the correction amount for the temperature detected by the temperature detecting means, and sets the write current for the recording means by correcting the reference write current read from the reference-write-current storing means in accordance with the correction amount read from the correction-amount storing means.

Thereby, it is not necessary to store the write currents for the respective recording means for respective temperatures. As a result, otherwise necessary data storage capacity can be reduced.

The correction-amount storing means may store:

temperature threshold values, for changing the write current, at respective addresses; and a current correction amount at an address between each pair of adjacent addresses at which the temperature threshold values are stored, respectively, the write current being corrected by the current correction amount stored at the address between the pair of adjacent addresses at which the temperature threshold values are stored, respectively, when the ambient temperature is between the temperature threshold values stored at the pair of adjacent addresses, respectively.

Thereby, the number of the storage means can be reduced.

The write-current setting means may comprise:

an optimum-write-current setting table for storing optimum write currents for respective temperatures; and write-current setting means for reading the optimum write current from the optimum-write-current setting table for the temperature detected by the temperature detecting means, and setting the thus-obtained optimum write current to be the write current of the recording means.

Thereby, the optimum write current setting can be performed without performing a calculation.

The recording means may have the optimum write current supplied, the supplied optimum write current being set by the write-current-setting means in accordance with the information to be recorded on the recording medium, the recording means generating a magnetic field in accordance with the supplied write current, magnetizing the recording medium by the generated magnetic field, and thus, recording the information on the recording medium.

This arrangement is advantageous for a hard disk device or the like in which the magnetization characteristics of the recording medium changes in accordance with a change of temperature.

The write-current setting means may change the optimum write current discretely within a predetermined operation guarantee temperature range (the operation guarantee temperature range means the temperature range within which the proper operation of the information storage device is guaranteed).

In this arrangement, it is possible to always set the optimum write current within the predetermined operation guarantee temperature range.

The predetermined operation guarantee temperature range may be from 0° C. through 60° C.

In this arrangement, it is possible to always set the optimum write current within the predetermined operation guarantee temperature range from 0° C. through 60° C.

The write-current setting means may set the write current at an optimum at a recording density equal to or greater than 5,000 TPI (Tracks Per Inch), at which recording density the recording means records the information on the recording medium.

In this arrangement, it is possible to record information at a high recording density.

The recording means may comprise a plurality of heads for recording the information on the recording medium; and the write-current setting means sets the optimum write current for each of the plurality of heads.

In this arrangement, it is possible to set the optimum write current for each of the plurality of heads in a hard disk device or the like in which the plurality of heads are used.

Another information storage device, according to the present invention, comprises:

a recording head for recording data on a recording medium;

a circuit substrate which is connected with the recording head, a circuit which generates a recording signal to be supplied to the recording head is mounted on the circuit substrate;

a flexible printed wiring sheet which connects between the recording head and the circuit substrate;

temperature detecting means, mounted on the flexible printed wiring sheet, for detecting an ambient temperature of the recording medium;

a timer, provided on the circuit substrate, for monitoring time for the temperature detecting means to detect the ambient temperature of the recording medium at predetermined times; and a write-current setting means, provided on the circuit substrate, for setting the write current for the ambient temperature of the recording medium detected by the temperature detecting means each time when the temperature detecting means detects the ambient temperature of the recording medium, the each time being obtained from the timer.

In this arrangement, as a result of mounting the temperature detecting means on the flexible printed wiring sheet which connects between the recording head and the circuit substrate, it is possible to arrange the temperature detecting means in proximity to the recording medium. Further, using the flexible printed wiring sheet, the temperature detecting means can be connected to the circuit substrate on which the timer and the writing-current setting means are mounted.

The intervals between the times at which the temperature measuring means detects the ambient temperature of the recording medium may be such that, during a period from a time of starting the power supply to a time at which a temperature of the recording medium has reached a steady-state temperature, the interval increases in sequence, and after the time at which the temperature of the recording medium has reached the steady-state temperature, the interval is fixed.

Thereby, even during the period from the time of starting the power supply to the time at which the temperature of the recording medium has reached the steady-state temperature, the write current is set in accordance with the temperature of the recording medium. As a result, it is possible to perform writing using the optimum write current. Further, after a predetermined time has elapsed from the time of starting the power supply, the ambient temperature of the recording medium is detected and the write current is set at regular intervals. As a result, unnecessary setting of the write current is prevented, and it is possible to perform writing using the optimum write current for the temperature of the recording medium.

The write current setting means may comprise:

reference-write-current storing means for storing a previously set reference write current for each recording means;

correction-amount storing means for storing correction amounts for respective temperatures detected by the temperature detecting means; and write-current controlling means which reads from the reference-write-current storing means the reference write current of the recording means for which the write current is to be set, reads from the correction-amount storing means the correction amount for the temperature detected by the temperature detecting means, and sets the write current for the recording means by correcting the reference write current read from the reference-write-current storing means in accordance with the correction amount read from the correction-amount storing means.

Thereby, it is not necessary to store the write currents for the respective recording means for respective temperatures. As a result, otherwise necessary data storage capacity can be reduced.

The correction-amount storing means may store:

temperature threshold values, for changing the write current, at respective addresses; and a current correction amount at an address between each pair of adjacent addresses at which the temperature threshold values are stored, respectively, the write current being corrected by the current correction amount stored at the address between the pair of adjacent addresses at which the temperature threshold values are stored, respectively, when the ambient temperature is between the temperature threshold values stored at the pair of adjacent addresses, respectively.

Thereby, the number of storage means can be reduced.

The write-current setting means may comprise:

an optimum-write-current setting table for storing optimum write currents for respective temperatures; and write-current setting means for reading the optimum write current from the optimum-write-current setting table for the temperature detected by the temperature detecting means, and setting the thus-obtained optimum write current to be the write current of the recording means.

Thereby, the optimum write current setting can be performed without performing a calculation.

The recording means may have the optimum write current supplied, the supplied optimum write current being set by the write-current-setting means in accordance with the information to be recorded on the recording medium, the recording means generating a magnetic field in accordance with the supplied write current, magnetizing the recording medium by the generated magnetic field, and thus, recording the information on the recording medium.

This arrangement is advantageous for a hard disk device or the like in which the magnetization characteristics of the recording medium changes in accordance with change of the temperature.

The write-current setting means may change the optimum write current discretely within a predetermined operation guarantee temperature range.

In this arrangement, it is possible to always set the optimum write current within the predetermined operation guarantee temperature range.

The predetermined operation guarantee temperature range may be from 0° C. through 60° C.

In this arrangement, it is possible to always set the optimum write current within the predetermined operation guarantee temperature range from 0° C. through 60° C.

The write-current setting means may set the write current at an optimum at a recording density equal to or greater than 5,000 TPI (Tracks Per Inch), at which recording density the recording means records the information on the recording medium.

In this arrangement, it is possible to record information at a high recording density.

The recording head may comprise a plurality of heads; and the write-current setting means sets the optimum write current for each of the plurality of heads.

In this arrangement, it is possible to set the optimum write current for each of the plurality of heads in a hard disk device or the like in which the plurality of heads are used.

Other objects and further features of the present invention will become more apparent from the following detailed description when read in conjunction with the accompanying drawings.

BRIEF DESCRIPTION OF THE DRAWINGS

FIG. 4 shows a data arrangement of a reference-write-current-value table in a flash ROM of the embodiment of the present invention;

FIG. 5 shows a temperature-threshold-value and current-indication-value table in the flash ROM of the embodiment of the present invention;

FIG. 6 shows a data arrangement of a set-current-value table 117a in a RAM in the embodiment of the present invention;

DETAILED DESCRIPTION OF THE PREFERRED EMBODIMENT

Figure 1:
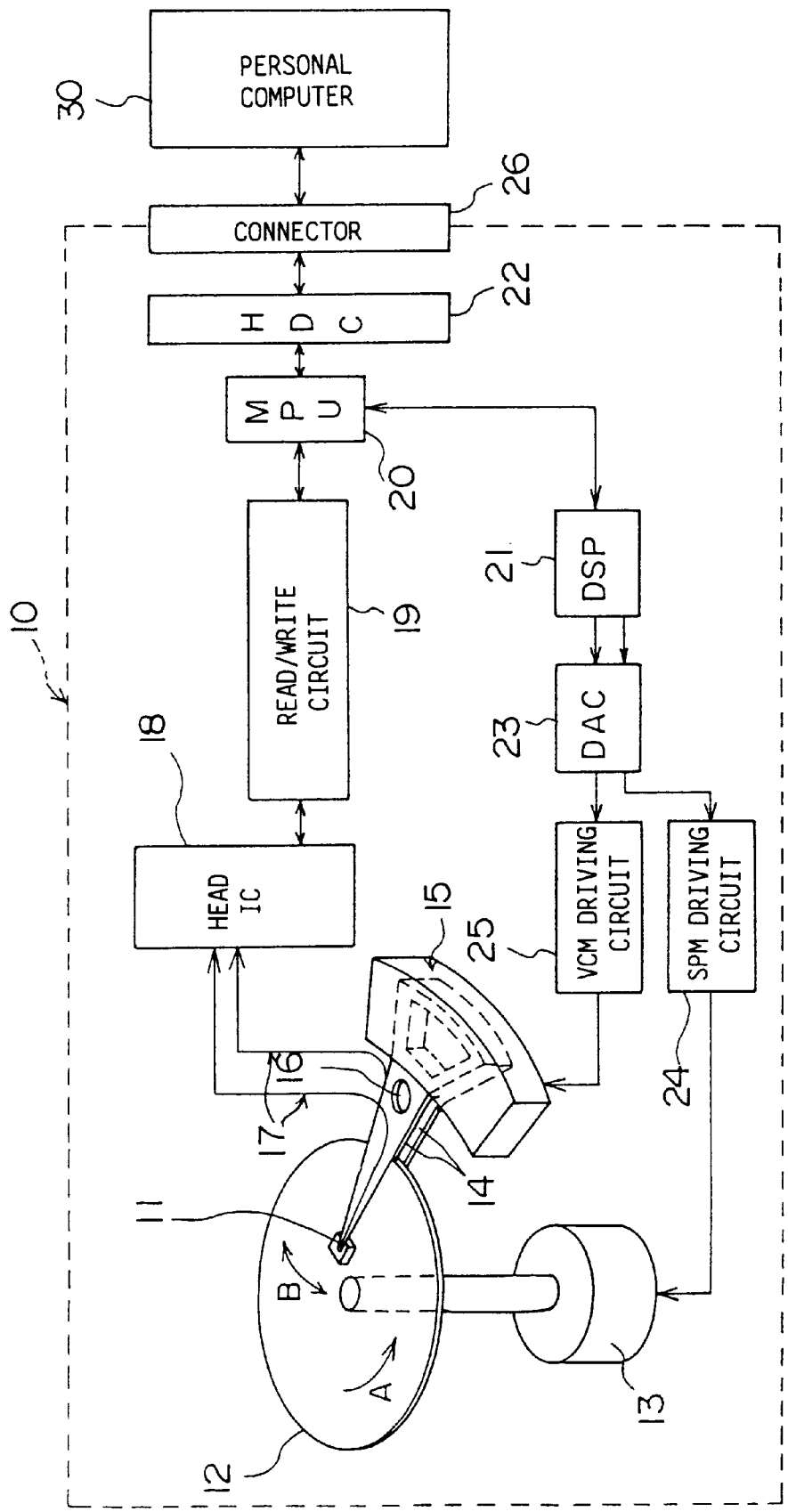
FIG. 1 shows a block diagram of an example of the related art.
Figure 2:
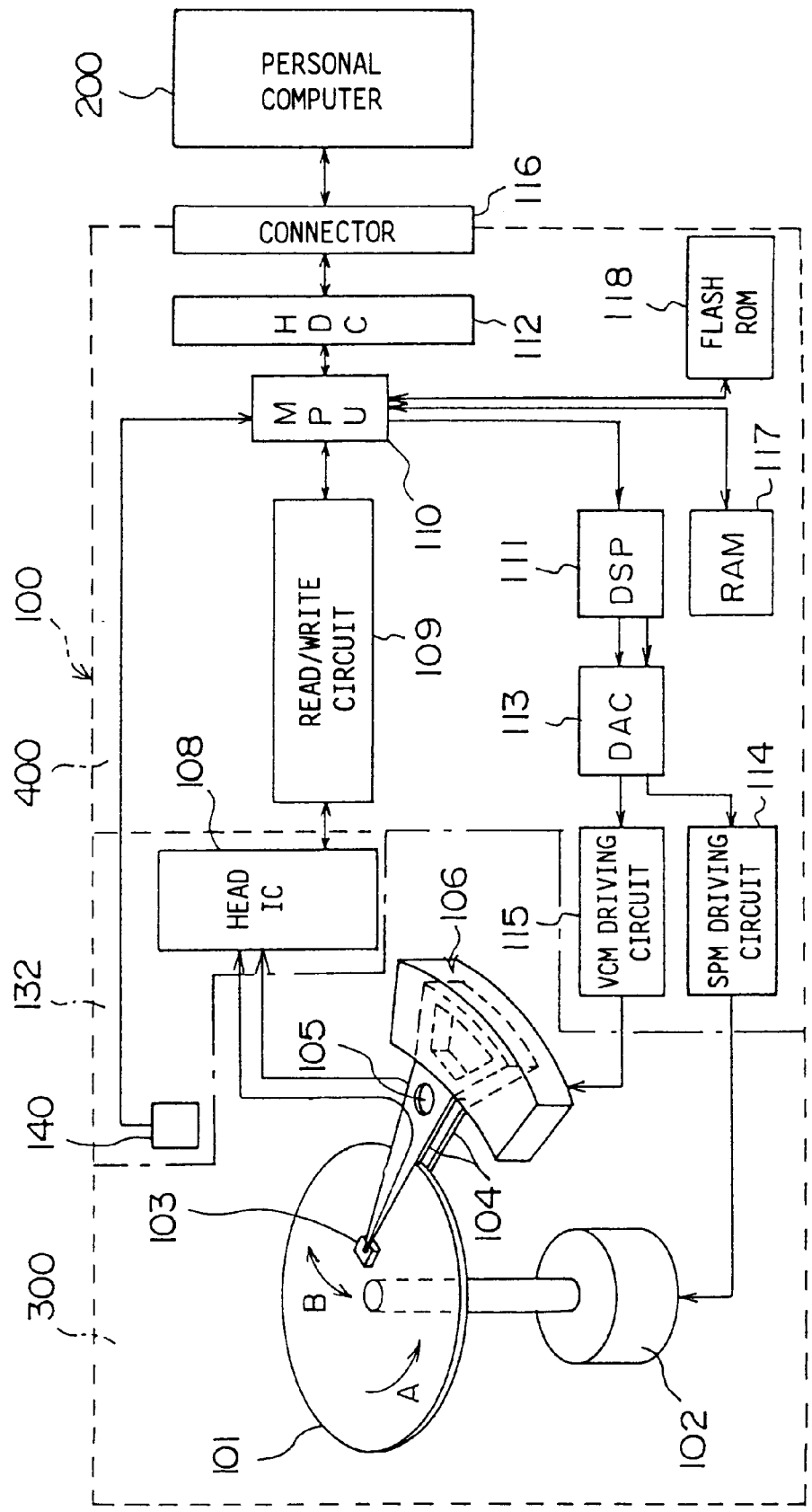
FIG. 2 shows a block diagram of one example of the present invention.
Figure 3:
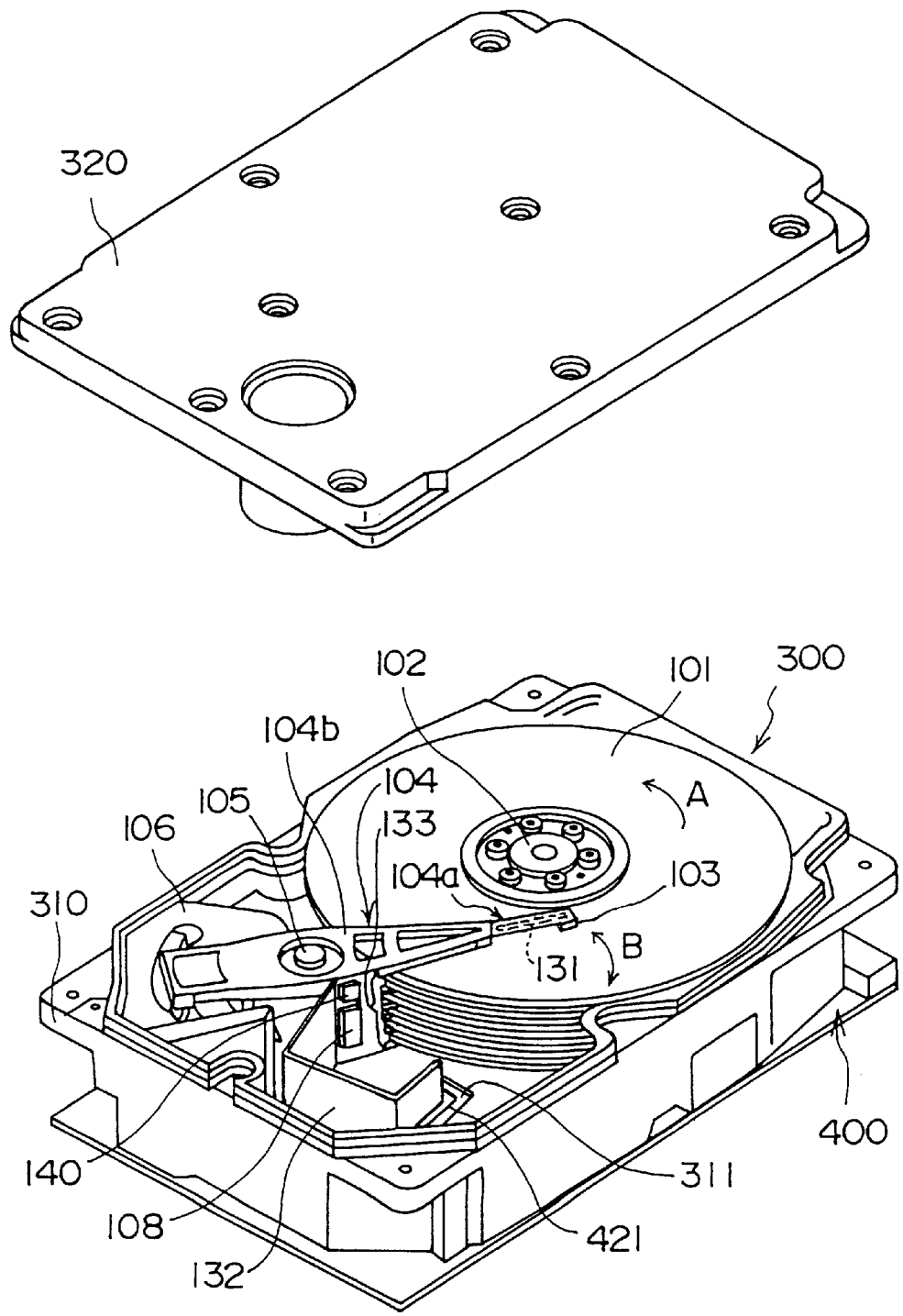
FIG. 3 shows a perspective view of the embodiment of the present invention in a state in which a cover has been removed from a base.

FIG. 2 shows a block diagram of a magnetic disk device (HDD: Hard-Disk Drive) 100 in one embodiment of the present invention. FIG. 3 shows a perspective view of the magnetic disk device 100.

In the magnetic disk device 100, the recording density is more than 5,000 TPI, on the order of 10,000 TPI.

The magnetic disk device 100 is connected with a personal computer 200, and magnetically records, in magnetic disks 101 through magnetic heads 103, information such as programs to be executed by the personal computer 200, data which has been processed by the personal computer 200, and so forth. Further, the magnetic heads 103 read information magnetically recorded in the magnetic disks 101 and reproduce the original information. In the magnetic disk device 100, a containing portion 300, which contains the magnetic disks 101, and a circuit substrate 400, on which circuits for recording information in and reproducing information from the magnetic disks 101 are formed, are integrally fixed to each other.

As shown in FIG. 3, the containing portion 300 includes a base 310 and a cover 320. (FIG. 3 shows a state in which the cover 320 is removed from the base 310.) The magnetic disks 101, the magnetic heads 103, arms 104, a spindle motor 102, a VCM (Voice Coil Motor) 106 and so forth are contained in the space formed by the base 310 and cover 320.

The magnetic disks 101 are fixed to the rotating shaft of the spindle motor 102 in the containing portion 300, and are rotated in the direction of the arrow A by the spindle motor 102. The magnetic heads 103 are provided adjacent to the surfaces of the magnetic disks 101, The magnetic heads 103 magnetically affect the magnetic disks 101 so as to record information on the magnetic disks 101 and read information recorded on the magnetic disks 101. The plurality of magnetic disks 101 are arranged in a stack. The two magnetic heads 103 are adjacent to both surfaces of each magnetic disk 101, respectively. For example, for the m magnetic disks 101-1 through 101-m, the 2m magnetic heads 103-1 through 103-2m are provided.

Each magnetic head 103 is fixed to a respective one of the arms 104. Due to rotation of the magnetic disks 101, each magnetic head 103 slightly floats from the respective one of the surfaces of the magnetic disks 101. In the floating condition, the magnetic heads 103 perform recording of information to and reproduction of information from the magnetic disks 101.

Each arm 104 includes a suspension arm 104a for elastically holding the magnetic head 103 and an actuator arm 104b which is fixed to the rotation member of the VCM 106. Each arm 104 holds the magnetic head 103 at the extended end of the suspension arm 104a. The suspension arm 104a is connected with the actuator arm 104b, which is fixed to the rotation member of the VCM 106 and is rotatable about a rotation shaft 105. The actuator arm 104b with the suspension arm 104a is rotated in radial directions of the disk 103 (in the directions of the arrow B) about the rotation shaft 105 by the VCM 106. Thus, the magnetic head 103 is moved to a desired position adjacent to the magnetic disk 101. Each magnetic head 103 is connected with the circuit substrate 400 through a connection member.

The connection member includes a conducting pattern 131 which is formed on a surface of the suspension arm 104a, an FPC (Flexible Printed Circuit) 132 for connecting with the circuit substrate 400 and an intermediate FPC 133 for connecting between the conducting pattern 131 and the FPC 132 (shown in FIG. 3).

The conducting pattern 131 extends from the magnetic head 131 fixed position to the actuator arm 104b on the suspension arm 104a and forms a side wall at the end of the actuator arm. One end of the intermediate FPC 133 is connected with the side wall of the conducting pattern 131.

Each intermediate FPC 133 is provided between the two respective adjacent magnetic disks 101. The above-mentioned end of the intermediate FPC 133 is connected with the side wall of the conducting pattern 131, and, through the conducting pattern 131, is connected with the magnetic head 103. The other end of the intermediate FPC 133 is connected to the FPC 132.

A head IC (Integrated Circuit) 108 and a temperature sensor 140 are mounted on the FPC 132. By providing the temperature sensor 140 on the FPC 132, it is possible to provide the temperature sensor 140 near to the magnetic heads 103 and the magnetic disks 101. It is possible to measure the temperature at the position near the position at which the magnetic heads 103 face the surfaces of the magnetic disks 101, respectively. Accordingly, it is possible to set an optimum write current that is suitable for the temperature at which the magnetic heads 101 write data on the magnetic disks 103, respectively.

The head IC 108 is provided on a wiring pattern which extends from the conducting patterns 131, to the intermediate FPCs 133, then to the FPC 132 and to the circuit substrate 400 and connects between the magnetic heads 103 and the circuit substrate 400. The head IC 108 amplifies recording signals, amplifies reproduced signals and so forth.

The temperature sensor 140 is connected, through a wiring pattern formed on the FPC 132, to an MPU (Micro Processor Unit) 110 provided on the circuit substrate 400.

The circuit substrate 400 includes a printed circuit board on which various chips such as ICs, resistance elements and so forth are provided. The outline shape of the circuit substrate 400 is approximately the same as the outline shape of the base 310. The circuit substrate 400 is in contact with the bottom surface of the base 310 and is fixed to the base 310.

An opening 311 is formed in the bottom plate of the base 310, for connecting the circuit substrate 400 and the FPC 132. At the position corresponding to the opening 311 of the bottom plate of the base 310, a connector 421 is provided on the circuit substrate 400. A connection terminal of the FPC 132 is inserted into the connector 421 so as to provide the connection between the circuit substrate 411 and the FPC 132.

Reproduced signals read from the magnetic disks 101 through the magnetic heads 103 are supplied to the circuit substrate 400 through the conducting pattern formed on the suspension arm 104a, the intermediate FPC 133, which is provided on a side wall of the actuator arm 104b and the FPC 132, on which the head IC 108 is provided. The reproduced signals are first supplied to the head IC 108, are amplified by the head IC 108, and then, are supplied to the circuit substrate 400, as shown in FIG. 2.

On the circuit substrate 400, a read/write circuit 109, the MPU 110, a DSP (Digital Signal Processor) 111, a HDC (Hard disk Drive Controller) 112, a DAC (Digital-to-Analog Converter) 113, a spindle-motor driving circuit 114, a voice-coil-motor driving circuit 115, a connector 116, a RAM (Random Access Memory) 117 and a flash ROM (Read Only Memory) 118 are provided.

The head IC 108 is connected with the circuit substrate 400 through a wiring pattern formed on the FPC 132, and is connected with the read/write circuit 109 on the circuit substrate 400. The read/write circuit 109 is connected with the MPU 110. The read/write circuit 109 encodes data supplied by the MPU 110 into recording signals, and decodes read signals read through the magnetic heads 103 into data which can be processed by the MPU 20.

The MPU 110 is connected with the read/write circuit 109, the DSP 111 and the HDC 112. The MPU 110 processes information to be recorded in the magnetic disks 101 and information reproduced from the magnetic disks 101. Further, the MPU 110 controls the rotation of the magnetic disks 101 and positioning of the magnetic heads 103 in accordance with information read from the magnetic disks 101.

Further, the MPU 110 is connected with the temperature sensor 140, and, as will be described later, recognizes the detected temperature detected by the temperature sensor 140. Then, the MPU 110 obtains write currents IW, based on reference write currents ISW of the respective magnetic heads 103 and an amount of current change ΔI set for the particular temperature stored in the flash ROM. Then, the MPU 110 sets the write currents for the respective magnetic heads 103-1 through 103-2m. The MPU has a built-in timer and setting of the write currents IW is performed at predetermined time intervals.

The DSP 111 generates digital data for controlling the rotation of the spindle motor 102 in accordance with digital data which is supplied by the MPU 110 and determines the rotational speed of the magnetic disks 101. Further, the DSP 111 generates digital data for controlling the rotation angle of the VCM 106 in accordance with digital data which is supplied by the MPU 110 and determines the positions of the magnetic heads 103.

The digital data for controlling the rotation of the spindle motor 102 and the digital data for controlling the rotation angle of the VCM 106, generated by the DSP 111, is supplied to a DAC 113. The DAC 113 converts the digital data for controlling the rotation of the spindle motor 102 and the digital data for controlling the rotation angle of the VCM 106, supplied by the DSP 111, into an analog signal.

The digital data for controlling the rotation of the spindle motor 102 supplied by the DSP 111 to the DAC 113 is converted into analog data by the DAC 113, as mentioned above, and then, this analog signal is supplied to the spindle-motor driving circuit 114. The spindle-motor driving circuit 114 generates a driving signal, for driving the spindle motor 102, in accordance with the analog signal supplied by the DAC 113, and supplies the driving signal to the spindle motor 102. The spindle motor 102 is driven and is rotated by the driving signal supplied from the spindle-motor driving circuit 114 so as to rotate the magnetic disks 101 in the direction of the arrow A at a fixed rotational speed.

The digital data for controlling the rotation angle of the voice coil motor 15 supplied by the DSP 111 to the DAC 113 is converted into analog data by the DAC 113, as mentioned above, and then, the analog signal is supplied to the voice-coil-motor driving circuit 115. The voice-coil-motor driving circuit 115 generates a driving signal, for driving the voice coil motor 106, in accordance with the analog signal supplied by the DAC 113, and supplies the driving signal to the voice coil motor 106. The driving signal supplied from the voice-coil-motor driving circuit 115 causes the voice coil motor 106 to control the rotation angle of the arms 104 in the directions of the arrow B and thus position the magnetic heads 103.

The HDC 112 is provided between the MPU 110 and the connector 116 which is used for external connection. The HDC 112 controls data transmission/reception between the magnetic-disk device 100 and external equipment connected to the connector 116.

The connector 116 is connected with external equipment such as a personal computer 200 or the like. Via the connector 116, data and various control signals are input and output.

In the flash ROM 118, a reference-write-current-value table 118a and a temperature-threshold-value and current-indication-value table 118b are provided for setting the write currents.

FIG. 4 shows a data arrangement of the reference-write-current-value table 118a set in the flash ROM 118 in the embodiment of the present invention.

In the reference-write-current-value table 118a set in the flash ROM 118, for example, at an address '*1', the reference current ISW1 previously set for the No.1 magnetic head 103-1 is stored. Similarly, at an address '*2', the reference current ISW2 previously set for the No.2 magnetic head 103-2 is stored. Similarly, at an address '*n', the reference current ISWn previously set for the No.n magnetic head 103-n is stored. Similarly, at an address '*(2m)', the reference current ISW2m previously set for the No.2m magnetic head 103-2m is stored.

FIG. 5 shows a data arrangement of the temperature-threshold-value and current-indication-value table 108b.

In the temperature-threshold-value and current-indication-value table 108b, at an address '11', a temperature threshold value τ1 is stored; at an address '13', a temperature threshold value τ2 is stored; and at an address '12' between the addresses '11' and '13', as a current indication value S1, a current change amount ΔI1 which is between the temperature threshold values τ1 and τ2 is stored. At address '15', a temperature threshold value τ3 is stored; and at an address '14' between the addresses '13' and '15', as a current indication value S2, a current change amount ΔI2 which is between the temperature threshold values τ2 and τ3 is stored. Similarly, at an address '1(2k−1)', a temperature threshold value τk is stored; and at an address '1**(2k)', as a current indication value Sk, a current change value ΔIk for a temperature equal to or greater than the threshold value τk is stored.

The above-described temperature-threshold-value and current-indication-value table 108b is set for each magnetic head 103-n (n=1, 2, 3, . . . , 2m).

The operation guarantee temperature range of the magnetic disk device 100 in the embodiment is set to be from 0° C. through 60° C., for example. The temperature-threshold-value and current-indication-value table 108b is set so that optimum-write-current setting is possible within the operation guarantee temperature range.

For example, the temperature threshold values τ1 through τk are set every 5° C. from 0° C. through 60° C. Thereby, the current indication value are changed in twelve steps within the operation guarantee temperature range.

In the embodiment, using the temperature-threshold-value and current-indication-value table 108b, the current changing values are managed for the temperature threshold values. However, it is also possible to set a table by which the current changing values are managed for temperature ranges.

Further, it is also possible to use the optimum write currents as the current indication values in the temperature-threshold-value and current-indication-value table 108b instead of the current changing values. Thereby, without performing a calculation such as addition, subtraction or the like, the optimum write current IW can be directly obtained with reference to the table for the temperature detected by the temperature sensor 140. If the optimum write currents are used as the current indication values in the temperature-threshold-value and current-indication-value table 108b shown in FIG. 5 instead of the current changing values, the reference-write-current-value table 118a shown in FIG. 4 is not needed.

Further, it is also possible to use current changing coefficients as the current indication values in the temperature-threshold-value and current-indication-value table 108b instead of the current changing values. In this case, the optimum write current is obtained as a result of multiplying the reference write current value by the current changing coefficient.

As will be described later, the MPU 110 obtains the write current based on the reference write current value stored in the reference-write-current-value table and the current indication value stored in the current-threshold-value and current-indication-value table, set in the flash ROM. The write current obtained by the MPU 110 is stored in a set-current-value table 117a set in the RAM 117.

FIG. 6 shows a data arrangement of the set-current-value table 117a set in the RAM in the embodiment of the present invention.

In the set-current-value table 117a set in the RAM 117, for example, at an address '21', the set write current IW1 for the No.1 magnetic head 103-1** is stored. Similarly, at an address '2\*\*2', the set write current IW2 for the No.2 magnetic head 103-2 is stored. Similarly, at an address '2\*\*n', the set write current IWn for the No.n magnetic head 103-n is stored. Similarly, at an address '2\*\*(2m)', the set write current IW2m for the No.2m magnetic head 103-2m is stored.

The MPU 110 supplies the write currents IW1, IW2, ..., IWn, ... to the magnetic heads in accordance with the set write currents set in the set-current-value table 117a of the RAM 117, respectively. Thus, information is written by the magnetic heads in the magnetic disks.

Figure 7:
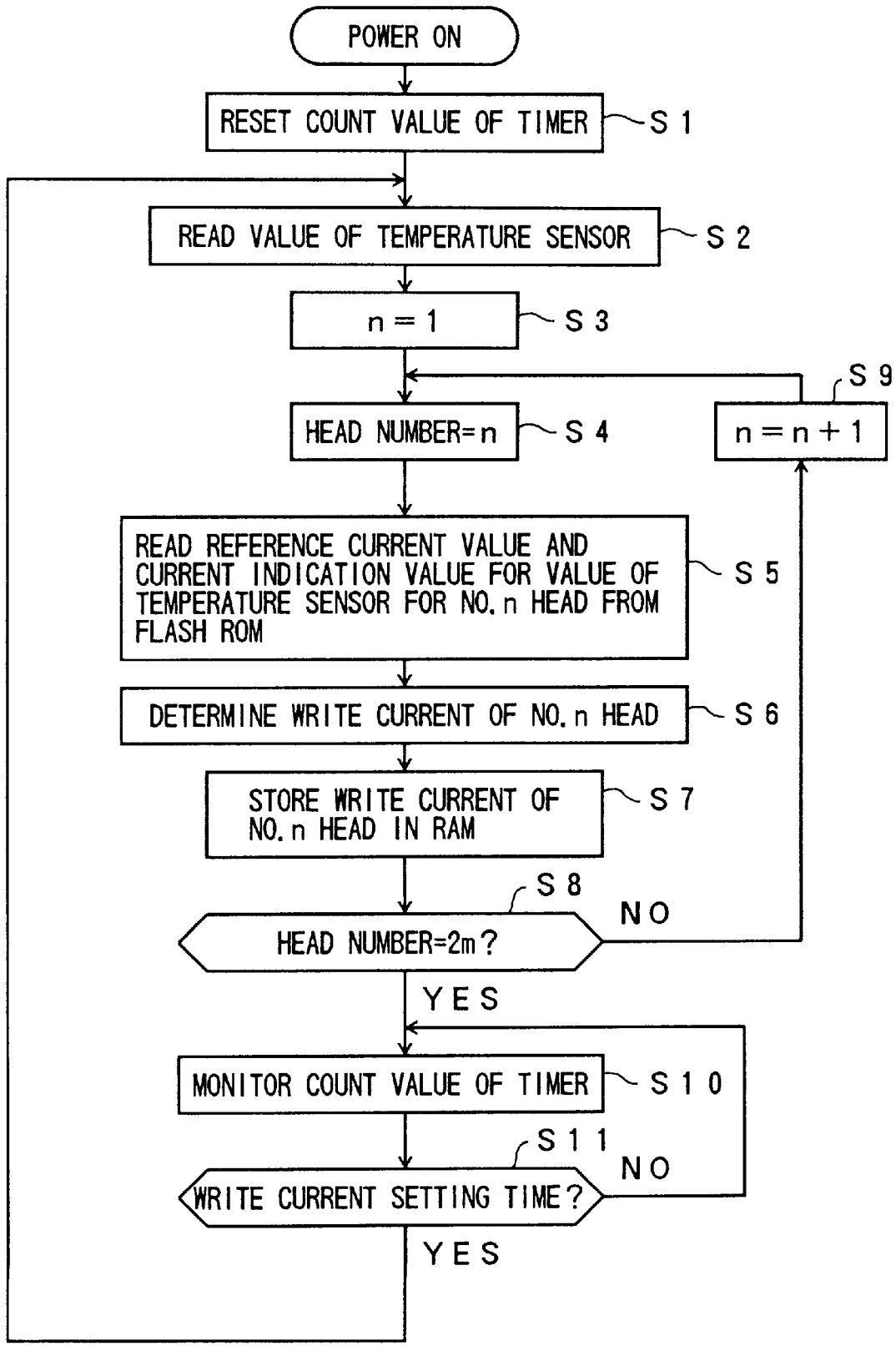
FIG. 7 shows an operation flowchart of a write-current setting operation of an MPU in the embodiment of the present invention.

FIG. 7 shows an operation flowchart of a write-current setting operation by the MPU in the embodiment of the present invention.

In the embodiment, the write current setting operation is performed when the power supply is started, and then, at predetermined time intervals after starting the power supply.

In a step S1, when the power supply is started, the MPU 110 resets the built-in timer for the write-current setting operation of the MPU 110 to indicate the time, 0.

Then, the MPU 110 reads the value of the temperature sensor 140 in a step S2. Further, in a step S3, the MPU 110 set a variable n which is used for identifying the magnetic head 103-n to be '1'.

Then, in a step S4, the magnetic head 103, for which the write current is to be set, is set to be the No.n magnetic head 103-n.

In step S5, with reference to the reference-write-current-value table 118a set in the flash ROM 118, the MPU 110 reads the current value ISWn previously set for the No.n magnetic head 103-n set in the step S4, and also, with reference to the current-threshold-value and current-indication-value table 118b set in the flash ROM 118, the MPU 110 reads the current change amount ΔIj for the detected temperature T (τj≦T<τ(j+1)) detected in the step S2, in a step S5. (In the case where the optimum write currents are used as the current indication values in the temperature-threshold-value and current-indication-value table 108b instead of the current changing values, the MPU 110 directly reads the optimum write current for the temperature T read in the step S2 with reference to the temperature-threshold-value and current-indication-value table 108b.)

Then, in a step S6, the MPU 110 adds the current change amount ΔIj and the reference write current ISWn read in the step S5 together so as to obtain and set the addition result as the write current IWn for the No.n magnetic head 103-n. (In the case where the optimum write currents are used as the current indication values in the temperature-threshold-value and current-indication-value table 108b instead of the current change values, the MPU 110 sets the optimum write current read from the temperature-threshold-value and current-indication-value table 108b as the write current IWn for the No.n magnetic head 103-n.)

Then, in a step S7, the MPU 110 stores, in the RAM 117, the write current IWn for the No.n magnetic head 103-n obtained in the step S6.

Thus, the setting of the write current IWn for the No.n magnetic head 103-n is completed.

Then, in a step S8, the MPU 110 determines whether or not the head number n of the magnetic head for which the write current has been set in the steps S4 through S7 has reached 2m which is the head number of the last magnetic head 103-2m. That is, in the step S8, it is determined whether or not the write current setting for all the magnetic heads 103-1 through 103-2m of the magnetic disk device 100 has been completed. If it is determined in the step S8 that the head number n of the magnetic head for which the write current has been set in the steps S4 through S7 has not yet reached 2m, that is, if there are magnetic heads for which the write current setting has not been performed, the MPU 110 increments the head number n by 1 in the step S9. Then, the operation returns to the step S4 and the MPU 110 continues the write current setting operation for the remaining magnetic heads.

Thus, the MPU 110 repeats the steps S4 through S7 until the head number n reaches 2m, and thus, performs the write current setting operation for all the magnetic heads 103-1 through 103-2m of the magnetic disk device 100.

In a step S10, the MPU 110 monitors the count value of the built-in timer, which measures a time, during which the write current setting operation is performed. When it is determined, in a step 11, as a result of monitoring the count value of the timer, that 2 minutes has elapsed since starting the power supply, the operation returns to the step 2, the ambient temperature is detected by the temperature sensor 140 and the writing current setting operation is performed again using the thus-obtained newly detected temperature.

Then, as shown in FIG. 7, the MPU 110 performs the write current setting operation (the steps from S2 through S8) after 3 minutes, after 5 minutes, after 8 minutes, after 13 minutes, and then, after 20 minutes. Then, the MPU 110 performs the write current setting operation (the steps from S2 through S8) every 20 minutes. Thus, information can be written in the magnetic disks with the optimum write currents suitable for the temperatures.

Figure 8:
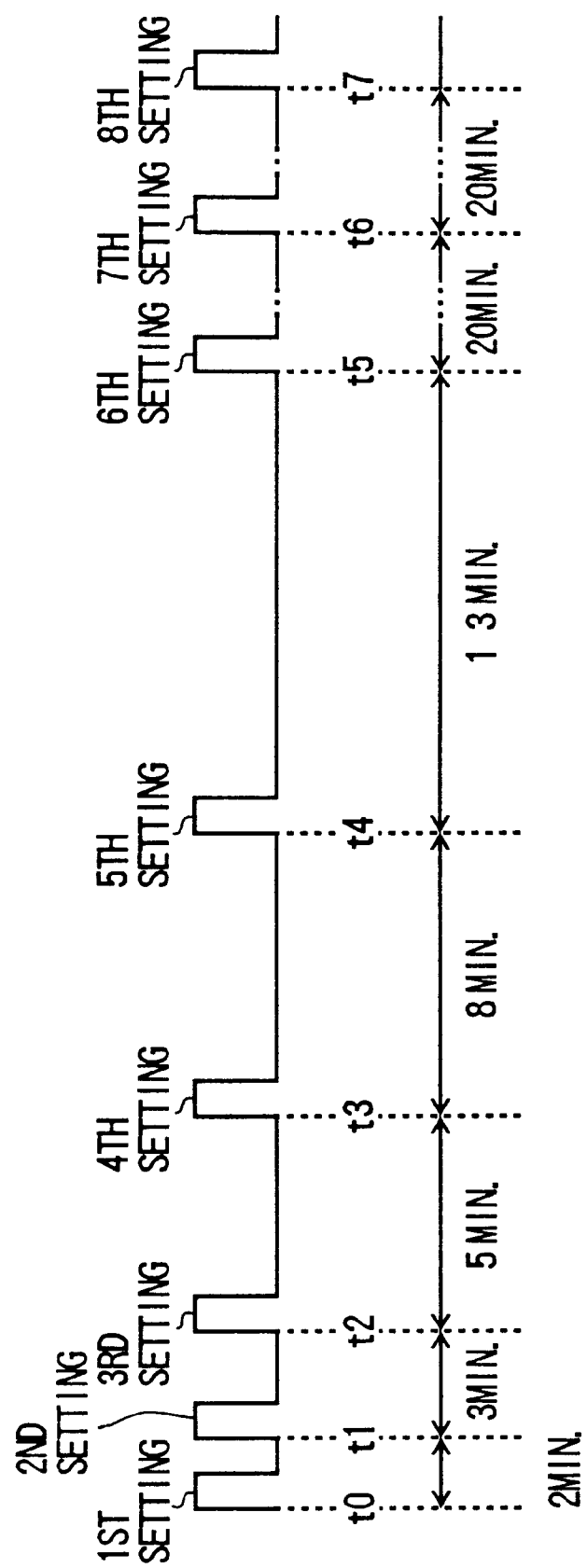
FIG. 8 illustrates a writing current setting operations in the embodiment of the present invention.

FIG. 8 illustrates the writing current setting operations in the embodiment of the present invention.

In the embodiment, as shown in FIG. 8, the first write current setting is performed at the time t0 at which power supply is started. Then, at the time t1 after 2 minutes has elapsed, the second write current setting is performed. Then, at the time t2 after 3 minutes have elapsed, that is, after 5 minutes have elapsed from the time t0, the third write current setting is performed.

Then, at the time t3 after 5 minutes have elapsed, that is, 10 minutes from the time t0, the fourth write current setting is performed. Then, at the time t4 after 8 minutes have elapsed, that is, 18 minutes from the time t0, the fifth write current setting is performed. Then, at the time t5 after 13 minutes have elapsed, that is, 31 minutes from the time t0, the sixth write current setting is performed. Then, at the time t6 after 20 minutes have elapsed, that is, 51 minutes from the time t0, the seventh write current setting is performed. After the time t6, i.e., 51 minutes from the time t0, the write current setting is performed every 20 minutes.

Thus, in the embodiment, the write current setting is made so that, during a short time period after starting the power supply, the write current setting is performed frequently. Immediately after starting the power supply, only a short time exists before a current is supplied to the spindle motor, voice coil motor and so forth. During this period, the case of the magnetic disk device is substantially unheated. Accordingly, the temperature of the inner space of the case is low and has not yet reached a steady-state temperature. Therefore, because the temperature of the inner space of the case is not stabilized, the write current setting is frequently performed and the write current setting is performed immediately after starting the power supply.

After the time t6, i.e., 51 minutes from the time t0 at which the power supply was started, the temperature inside the case will reach the stabilized steady-state temperature. Accordingly, the interval of repetition for the write current setting is set to be on the order of 20 minutes. After the time t6, i.e., 51 minutes from the time 0 at which the power supply was started, because the temperature inside the case will reach the steady-state temperature, even when the external temperature changes sharply, the temperature inside the case of the magnetic disk device does not change so sharply. Accordingly, by performing the write current setting on the order of every 20 minutes, the write currents can be set to follow such a temperature change.

In the embodiment, for the sake of providing simple wiring, the temperature sensor 140 is provided on the FPC 32. However, the arrangement of the temperature sensor 140 is not limited to this. As long as the temperature sensor is provided at a position such that the temperature sensor can detect an ambient temperature of the magnetic disks 101, the temperature sensor can be provided anywhere.

Further, it is also possible that the temperature sensor 140 detects an ambient temperature of the magnetic disks using temperature characteristics of a semiconductor. In this case, for example, it is possible that the temperature sensor 140 is formed integrally with the head IC 108 (semiconductor chip). In this case, by mounting the head IC 108 on the FPC 132, the temperature sensor 140 is connected with the MPU 110 mounted on the circuit substrate 400, via the head IC and the FPC 132. Thus, the assembling work can be simplified.

Further, it is also possible to provide the temperature sensor 140 directly on the circuit substrate 400 at a position exposed through the opening 311 which is formed in the bottom plate of the base 310. In this case, the temperature sensor 140 can be connected with the MPU 110 using printed wiring on the circuit substrate 400.

Further, the embodiment is directed to a magnetic disk device (hard-disk drive) as an information storage device according to the present invention. However, the information storage device according to the present invention is not limited to the magnetic disk device. The present invention can also be applied to an optimum write current setting of a device in which information is written in a recording medium, the characteristics of which change due to temperature change, such as a magneto-optical disk device or the like.

The present invention is not limited to the above-described embodiment, and variations and modifications may be made without departing from the scope of the present invention.

What is claimed is:

1. An information storage device having at least one recording medium for storing information, comprising:

at least one recording head provided for each one of the at least one recording medium, each said recording head being responsive to a write current, and recording information on the recording medium;

a temperature sensor;

write current selector;

a timer selectively initiating operation of said temperature sensor and said write current selector at predefined time intervals, wherein in response to a signal from said timer, said temperature sensor detects an ambient temperature of the recording medium, and said write current selector specifies a write current supplied to said recording head in relation to said ambient temperature detected by said temperature sensor;

wherein said predefined time intervals are adjusted such that, during a period from a time of starting a power supply to a time at which said detected ambient temperature of said recording medium has reached a steady-state temperature, said predefined time intervals sequentially increase, and after the time at which the temperature of said recording medium has reached the steady-state temperature, the intervals are fixed.

2. The information storage device, according to claim 1, wherein said write current selector comprises:

reference-write-current memory for storing a previously set reference write current for each of said at least one recording head;

correction-amount memory for storing correction amounts for respective temperatures detected by said temperature sensor; and write-current controlling means which reads from said reference-write-current memory a selected said reference write current of a selected said recording head for which the write current is to be set, reads from said correction-amount memory said correction amount for the temperature detected by said temperature sensor, and sets the write current for said selected recording head by correcting the reference write current read from said reference-write-current memory in accordance with the correction amount read from said correction-amount memory.

3. The information storage device, according to claim 2, wherein said correction-amount memory stores:

plural sets of temperature threshold values, for changing the write current; and a current correction amount for each said set of threshold values, said reference write current being adjusted by a selected said current correction amount when said detected ambient temperature is within a corresponding said set of temperature threshold values.

4. The information storage device, according to claim 1, wherein said write-current selector comprises:

an optimum-write-current setting table for storing optimum write currents for respective temperatures; and means for reading the optimum write current from said optimum-write-current setting table for the temperature detected by said temperature sensor, and setting an optimum write current, obtained from said optimum-write-current setting table, to be the write current of said recording head.

5. The information storage device, according to claim 1, wherein an optimum write current is supplied to said recording head, the supplied optimum write current being set by said write-current selector, said recording head generating a magnetic field in accordance with the supplied optimum write current so as to magnetize said recording medium by the generated magnetic field, and record information on said recording medium.

6. The information storage device, according to claim 1, wherein said write-current selector discretely changes the optimum write current within a predetermined operation guarantee temperature range.

7. The information storage device according to claim 6, wherein said predetermined operation guarantee temperature range is from 0° C. through 60° C.

8. The information storage device according to claim 1, wherein said write-current selector sets the write current to an optimum for a recording density equal or greater than 5,000 TPI (Tracks Per Inch), at which recording density said recording head records the information on the recording medium.

9. The information storage device according to claim 1, wherein:

said write-current selector individually sets an optimum write current for each of said plurality of recording heads.

10. An information storage device, comprising:

a recording head for recording data on a recording medium;

a circuit substrate connected with said recording head, including a circuit, mounted on said circuit substrate, which generates a recording signal to be supplied to said recording head;

a flexible printed wiring sheet connected between said recording head and said circuit substrate;

temperature detecting means, mounted on said flexible printed wiring sheet, for detecting an ambient temperature of said recording medium;

a timer, provided on said circuit substrate, for monitoring time for said temperature detecting means to detect the ambient temperature of said recording medium at predetermined times; and write-current setting means, provided on said circuit substrate, for setting the write current for the ambient temperature of said recording medium detected by said temperature detecting means each time said temperature detecting means detects the ambient temperature of said recording medium, said each time being provided by said timer.

11. The information storage device, according to claim 10, wherein intervals between the time at which said temperature measuring means detects the ambient temperature of said recording medium is such that, during a period from a time of starting a power supply to a time at which a temperature of said recording medium has reached a steady-state temperature, the intervals sequentially increase, and after the time at which the temperature of said recording medium has reached the steady-state temperature, the intervals are fixed.

12. The information storage device, according to claim 10, wherein said write current setting means comprises:

reference-write-current storing means for storing a previously set reference write current for said recording head;

correction-amount storing means for storing correction amounts for respective temperatures detected by said temperature detecting means; and write-current controlling means which reads from said reference-write-current storing means the reference write current, reads from said correction-amount storing means the correction amount for the temperature detected by said temperature detecting means, and sets the write current for said recording head by correcting the reference write current read from said reference-write-current storing means in accordance with the correction amount read from said correction-amount storing means.

13. The information storage device, according to claim 12, wherein said correction-amount storing means stores:

a plurality of pairs of temperature threshold values, for changing the write current, at respective addresses; and a current correction amount for each pair of temperature threshold values, the write current being corrected by a selected current correction amount when the ambient temperature is between corresponding said temperature threshold values.

14. The information storage device, according to claim 10, wherein said write-current setting means comprises:

an optimum-write-current setting table for storing optimum write currents for respective temperatures; and means for reading the optimum write current from said optimum-write-current setting table for the temperature detected by said temperature detecting means, and setting an optimum write current, obtained from said optimum-write-current setting table, to be the write current of said recording head.

15. The information storage device, according to claim 10, wherein an optimum write current is supplied to said recording head, the supplied optimum write current being set by said write-current-setting means in accordance with the information to be recorded on said recording medium, said recording means generating a magnetic field in accordance with the supplied write current so as to magnetize said recording medium by the generated magnetic field, and record the information on said recording medium.

16. The information storage device, according to claim 11, wherein said write-current setting means discretely changes the optimum write current within a predetermined operation guarantee temperature range.

17. The information storage device according to claim 16, wherein said predetermined operation guarantee temperature range is from 0° C. through 60° C.

18. The information storage device according to claim 10, wherein said write-current setting means sets the write current to an optimum for a recording density equal to or more than 5,000 TPI (Tracks Per Inch), at which recording density said recording head records the information on said recording medium.

19. The information storage device according to claim 10, wherein:

said recording head comprises a plurality of heads; and said write-current setting means individually sets the optimum write current for each of said plurality of heads.

* * * * *